United States Patent Office 3,425,117
Patented Feb. 4, 1969

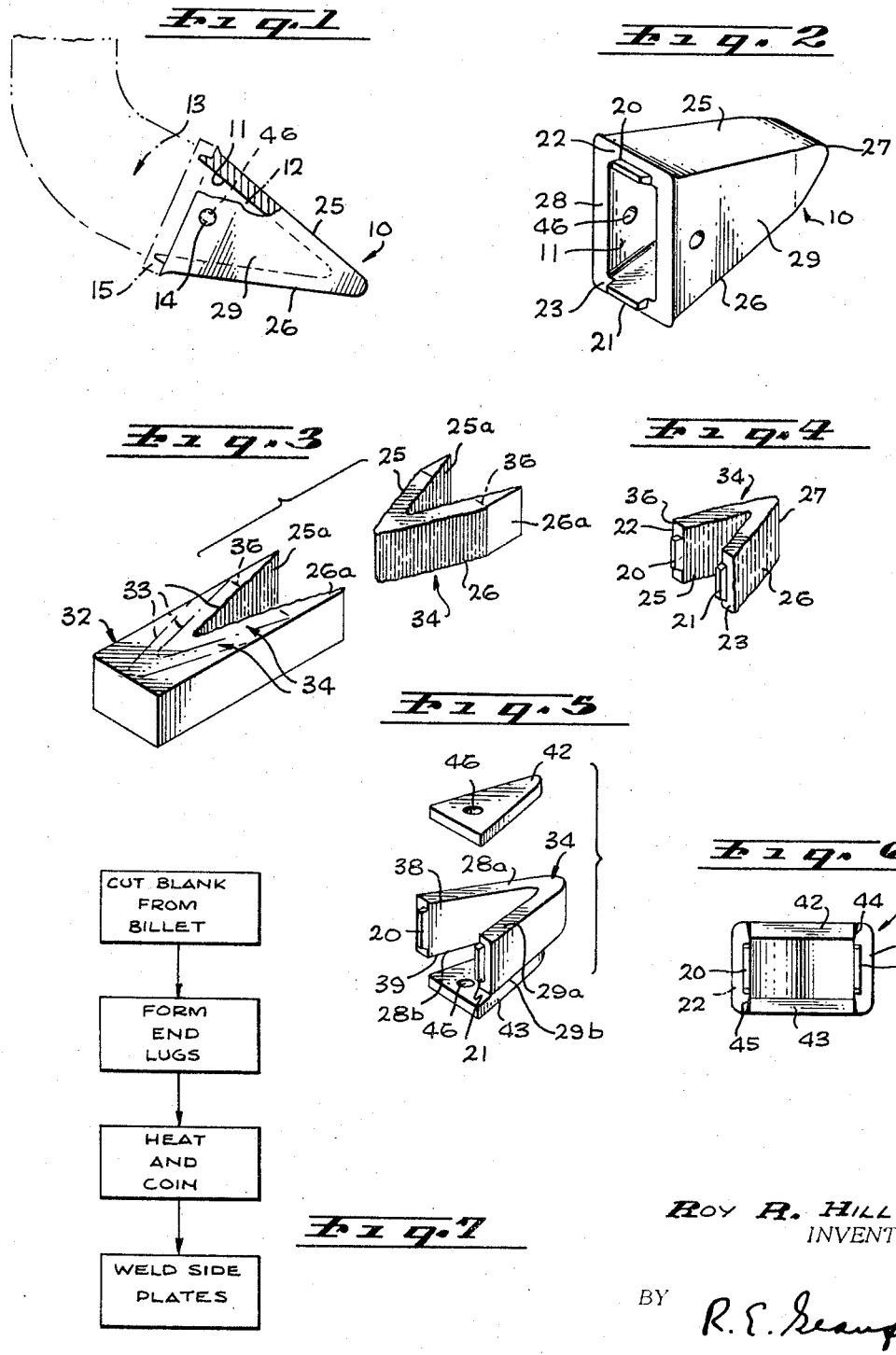

3,425,117
METHOD OF FORMING EXCAVATION TEETH
Roy R. Hill, Alhambra, Calif., assignor to Rheem Manufacturing Company, New York, N.Y., a corporation of California
Filed Dec. 5, 1966, Ser. No. 599,254
U.S. Cl. 29—475  6 Claims
Int. Cl. B23k 29/00; B21k 19/00; B23p 15/00

This invention relates to a method of forming excavation teeth and more particularly to a method of forming teeth in which relatively inexpensive material can be utilized.

At present, ripper teeth are produced from a single piece of bar or round stock which is forged into a tooth shape by expensive and time consuming steps. The bar stock is alloy steel which must be obtained in large stock size so that the base material is expensive, and large expensive upsetting equipment must be utilized.

By the present invention, the tooth can be formed from billet steel which is considerably cheaper than bar or round stock. A series of generally V-shaped blanks are first cut by burning from a rectangular shaped, cold billet. Each blank is then heated and placed in a female die to form the shape of the interior cavity of the tooth which corresponds to the shape of the end of the shank to which the tooth is attached. The exterior surface of the member can be further shaped, if necessary, by a burning operation. After the interior and exterior shape of the blank is formed, side plates are placed at each side of the cavity and welded to the blank in order to complete the cavity for receiving the end of the shank. The side plates can be cut from standard, inexpensive plate material and can be welded to the blank using simple welding fixtures.

It is therefore an object of the present invention to provide a method of forming excavation teeth with inexpensive material and equipment.

Another object of the invention is to provide a method of forming excavation teeth from billet steel and plate material.

These and other objects of the invention not specifically set forth above will become readily apparent from the accompanying description and drawings in which:

FIGURE 1 is a side elevational view, partially in section, showing a completed tooth attached to the end of a shank;

FIGURE 2 is a perspective view of a complete tooth formed by the present invention;

FIGURE 3 is a perspective view of a billet illustrating the manner in which the V-shaped blanks are cut from the billet;

FIGURE 4 is a perspective view of a V-shaped blank which has been cut to form two end lugs;

FIGURE 5 is an expanded perspective showing the side plates which are welded to the V-shaped blank;

FIGURE 6 is an end elevational view of the complete tooth after attachment of the side plates; and FIGURE 7 is a process chart showing the steps utilized in forming a tooth.

The complete tooth 10 formed by the present invention is illustrated in FIGURES 1, 2 and 6. The tooth contains a wedge-shaped cavity 11 into which the wedge-shaped end 12 of shank 13 is inserted and a pin 14 secures the tooth to the end 12. An enlarged flange 15 on the shank 13 contains recesses for receiving the end lugs 20 and 21 which are formed on two back edges 22 and 23, respectively, of the tooth. The upper end of the shank can be attached to a support bar carried by a bulldozer or other power equipment. The sides 25 and 26 of the tooth are substantially rectangular in shape and are inclined to one another to meet at apex 27 whereas sides 28 and 29 are substantially triangular in shape and are approximately parallel to one another.

The tooth 10 is fabricated from a rectangular billet 32 which has a height corresponding to the desired transverse width of the tooth (length of apex 27). A plurality of V-shaped cuts 33 are made in the billet so that adjacent cuts form a plurality of V-shaped blanks 34. It is apparent that the same cut will form the outside surfaces 25 and 26 of one blank 34 and at the same time form the inside surfaces of the blank 34 ahead of it. After the plurality of blanks 34 are cut from the billet 32, each of the sides 25 and 26 have trailing portions 25a and 26a which are burned away along line 36 to form the flat ends 22 and 23. During the burning operation, the lugs 20 and 21 are formed on these ends and the remaining material is removed. After these burning operations, the V-shaped blank 34 is in the form illustrated in FIGURE 4 and all of the V-shaped blanks cut from the billet 32 have the same shape since the outer surface of one corresponds to the inner surface of the adjacent one.

The blank 34, after being cut into the form of FIGURE 4, is heated and placed in the female die (not shown) so that the interior cavity 11 can be coined into the required shape to snugly receive the end 12 of the shank. Thereafter, the edges 38 and 39 around the cavity 11 are tapered for receiving weld metal so that side plates 42 and 43 can be attached to the V-shaped blank 34 by welding. This attachment can be accomplished by locating the plate 42 with its top surface flush with the edges 28a and 29a of the blank and holding the plate by suitable weld fixture while weld metal 44 is deposited along the edge 38. Thereafter, the blank is turned over and plate 43 is positioned with its surface flush with the edges 28b and 29b of blank 34 so that weld metal 45 can be deposited along the tapered edge 39. The plates 42 and 43 can be cut by burning from flat plate stock having a thickness to provide the necessary strength to retain the shape of the tooth under operating stresses. Before attaching the side plates to the blank, an oblong hole 46 is drilled or cut in each of the side plates to receive the pin 14 which holds the tooth into the shank. It is understood that side 28 is formed of edges 28a and 29a and plate 42, while side 29 is formed of edges 28b and 29b and plate 43.

In summary, the steps in forming the tooth are illustrated in FIGURE 7 and consist of first cutting a V-shaped blank 34 from the billet 32 and thereafter cutting off the ends of the blank while leaving the lugs 20 and 21. Thereafter, the blank is heated and coined to obtain an internal shape which is suitable for receiving the shank end 12. The next step consists of welding the side plates 42 and 43 to the blank in order to further apparent that the tooth can be formed of billet steel close the cavity 11. From the above description, it is which is considerably cheaper than bar or roll stock and that the side plates 42 and 43 can be cut from billet material. All of the cutting steps can be accomplished by burning and the welding of the side plates can be accomplished with simple fixtures. Also, because of the manner in which the successive blanks are cut from rectangular billet 32, very little waste results in forming the V-shaped blanks 34. After the tooth 10 is completely formed, it can be heat treated in order to produce a high tensile strength required for excavation purposes.

While the steps in the formation of the tooth have been set forth in a sequence, it is understood that the sequence of the steps can be varied. Further, it is not necessary to form the lugs 20 and 21 if they are not required for the attachment of the tooth to the shank. It is recognized that various modifications can be made within the scope of the invention, which is therefore not

What is claimed is:

1. A method of forming an excavation tooth to be attached to the end of a shank of an excavation machine comprising the steps of:
cutting a substantially V-shaped blank from a billet;
squaring off the ends of the sides of the blank;
coining the interior of the blank to shape the interior to conform to the end of the shank; and
attaching a side plate flush with the edge of each side of the blank to form a cavity and complete the tooth.

2. A method as defined in claim 1 wherein said squaring off step comprises forming a lug on each squared off end of the said blank.

3. A method as defined in claim 1 including the step of forming a hole in each side plate to receive a pin for attaching said tooth to said shank.

4. A method as defined in claim 1 wherein said attaching step comprises tapering the outside edges of the interior surface of said blank and applying weld metal between said tapered edges and said side plates.

5. A method as defined in claim 1 wherein said blank is cut from said billet by burning.

6. A method as defined in claim 1 wherein said cutting step forms said blank so that the outer surface of said blank and the inner surface of an adjacent blank are formed by the same cut.

References Cited

UNITED STATES PATENTS

| | | | |
|---|---|---|---|
| 1,485,879 | 3/1924 | Page | 37—142 |
| 1,639,593 | 8/1927 | Dean | 29—148.3 X |
| 2,435,846 | 2/1948 | Robertson | 37—142 |
| 2,658,463 | 11/1953 | Jaeger | 29—148.3 X |

JOHN F. CAMPBELL, *Primary Examiner.*

D. C. REILEY, *Assistant Examiner.*

U.S. Cl. X.R.

29—148.3, 417